US012049856B2

(12) United States Patent
Cordeiro Cardoso

(10) Patent No.: US 12,049,856 B2
(45) Date of Patent: Jul. 30, 2024

(54) DEVICE FOR HEATING AND MONITORING THE TEMPERATURE OF FUEL IN THE FUEL LINE OF AN INTERNAL-COMBUSTION ENGINE

(71) Applicants: Vitorio Francisco Rizzotto, Porto Alegre (BR); João Junior Cordeiro Cardoso, São Leopoldo (BR)

(72) Inventor: João Junior Cordeiro Cardoso, São Leopoldo (BR)

( * ) Notice: Subject to any disclaimer, the term of this patent is extended or adjusted under 35 U.S.C. 154(b) by 0 days.

(21) Appl. No.: 17/600,845

(22) PCT Filed: May 24, 2019

(86) PCT No.: PCT/BR2019/050193
§ 371 (c)(1),
(2) Date: Oct. 1, 2021

(87) PCT Pub. No.: WO2020/198822
PCT Pub. Date: Oct. 8, 2020

(65) Prior Publication Data
US 2022/0195969 A1 Jun. 23, 2022

(30) Foreign Application Priority Data
Apr. 3, 2019 (BR) .......................... 102019006777-2

(51) Int. Cl.
*F02M 31/02* (2019.01)
*F02M 31/125* (2006.01)
*G05D 23/19* (2006.01)

(52) U.S. Cl.
CPC ....... *F02M 31/125* (2013.01); *G05D 23/1919* (2013.01)

(58) Field of Classification Search
CPC ..... H02J 7/0063; F02M 31/02; F02M 31/125; F02M 31/16; G05D 23/1919; G05D 23/303
See application file for complete search history.

(56) References Cited

U.S. PATENT DOCUMENTS 2,346,506 A * 4/1944 Pulliam .................. F02N 19/04
219/205
2,953,022 A * 9/1960 Laub ..................... G01F 1/6847
73/204.22
(Continued)

FOREIGN PATENT DOCUMENTS

BR   PI0902488 A2   4/2010
CN   202250534 U    5/2012
(Continued)

OTHER PUBLICATIONS

International Search Report in International Application No. PCT/BR2019/050193, Mailed Jan. 6, 2020.

*Primary Examiner* — George C Jin
*Assistant Examiner* — Teuta B Holbrook
(74) *Attorney, Agent, or Firm* — Berg Hill Greenleaf Ruscitti LLP

(57) ABSTRACT

The present invention comprises a device which carries out an increase in the temperature by means of the fuel induction to potentialize the burning power of the internal combustion engine. The device of the present invention is installed in the engine of automotive vehicles by the fuel entry in the front part of the vehicle up to the beginning of the injector nozzles flute, there being used hose couplings similar to those currently applied in the vehicles. Before the fuel enters the fuel injection system of the vehicle, the same goes through the device that is the object of the present patent application in the internal part of a resistor (4) by a tube (5). The temperature of the resistor is controlled by a control circuit (Continued)

(3), which receives pulses coming from a central circuit (1), which controls the amperage level that passes to the control circuit (3) by means of information provided by the temperature sensors (2).

5 Claims, 1 Drawing Sheet

(56) References Cited

U.S. PATENT DOCUMENTS

| | | | | |
|---|---|---|---|---|
| 3,019,325 | A | | 1/1962 | Clouse |
| 3,690,807 | A | * | 9/1972 | Paxton ............... F23C 15/00 60/39.77 |
| 4,325,345 | A | | 4/1982 | Wilkinson |
| 4,465,922 | A | * | 8/1984 | Kolibas ............... F24H 1/121 392/494 |
| 4,519,341 | A | * | 5/1985 | McGarr ............... F02M 25/00 123/549 |
| 5,070,852 | A | * | 12/1991 | Po ............... F02M 27/045 123/549 |
| 5,831,244 | A | * | 11/1998 | Springer, Jr. ............... B60H 1/2218 219/205 |
| 6,318,150 | B1 | * | 11/2001 | Temple ............... G01N 1/2258 73/23.31 |
| 9,044,721 | B2 | * | 6/2015 | Forsberg ............... B01J 23/745 |
| 2005/0227575 | A1 | * | 10/2005 | Pierson ............... A63H 19/14 446/93 |
| 2006/0072270 | A1 | * | 4/2006 | Mladenik ............... H02H 3/00 361/93.1 |
| 2007/0295314 | A1 | * | 12/2007 | Dong ............... F02M 31/125 123/538 |
| 2009/0126655 | A1 | * | 5/2009 | Huang ............... F02M 37/0052 123/549 |
| 2009/0178651 | A1 | * | 7/2009 | Gale ............... F02M 31/125 123/549 |
| 2011/0214988 | A1 | * | 9/2011 | Yoshida ............... G01N 27/417 204/406 |
| 2015/0267671 | A1 | * | 9/2015 | Kabasin ............... F02M 31/125 219/498 |
| 2017/0211523 | A1 | * | 7/2017 | Rowley ............... F02M 27/045 |
| 2017/0254299 | A1 | * | 9/2017 | Smith ............... B01D 35/005 |
| 2019/0096535 | A1 | * | 3/2019 | Olshansky ............... G21B 3/00 |

FOREIGN PATENT DOCUMENTS

| | | | | |
|---|---|---|---|---|
| CN | 202500683 | U | | 10/2012 |
| CN | 206111348 | U | * | 4/2017 |
| CN | 108104992 | A | * | 6/2018 |
| CN | 108661830 | A | * | 10/2018 |
| CN | 108944424 | A | * | 12/2018 |
| CN | 109339989 | A | * | 2/2019 ............. F02D 45/00 |
| CN | 109356754 | A | * | 2/2019 |
| DE | 102015114805 | A1 | * | 3/2016 ............. B60R 16/03 |
| EP | 1209346 | A2 | | 5/2002 |
| FR | 2949509 | A1 | * | 3/2011 ............... F01P 7/16 |
| GB | 2058920 | A | * | 4/1981 ............. F02B 77/04 |
| KR | 20110026768 | A | | 3/2011 |
| WO | WO-2010084358 | A2 | * | 7/2010 ............... C25B 1/04 |
| WO | WO-2012143193 | A1 | * | 10/2012 ........... B60H 1/2218 |
| WO | WO-2017021659 | A1 | * | 2/2017 ........... G05B 19/045 |

* cited by examiner

DEVICE FOR HEATING AND MONITORING THE TEMPERATURE OF FUEL IN THE FUEL LINE OF AN INTERNAL-COMBUSTION ENGINE

CROSS REFERENCE TO RELATED APPLICATION

This application is a national stage application under 35 U.S.C. 371 of PCT Application No. PCT/BR2019/050193 having an international filing date of May 24, 2019, which designated the United States, which PCT application claimed the benefit of Brazilian Application Serial No. BR 102019006777-2, filed Apr. 3, 2019, both of which are incorporated by reference in their entirety.

TECHNOLOGY FIELD OF THE INVENTION

In a general manner, the present invention refers to the technology field of automotive mechanics solutions and refers, more specifically, to a device focused on the economy of fossil fuels by automotive vehicles. The invention comprises a device which executes an inductive controlled heating of the fuel to potentialize the burning power of an internal combustion engine.

BACKGROUND OF THE INVENTION

The internal combustion engines are widely used in automotive vehicles, such as cars and motorcycles, trucks and remaining vehicles currently available in the market. The internal combustion engine works by burning fuel, generating an explosion in the internal compartment, pushing a mechanical element known as a piston, whereby said piston is axially connected to an axis, known as crankshaft, executing a rotary movement of a gear on the external part of the motor.

The internal combustion engine was first used in cars by the company known nowadays as Mercedez-Bens. The German Karl Bens, holder of the patent for the internal combustion car, used an engine comprising only a four-stroke cylinder. The car served as a substitute for the famous steam-powered wagons, created in China around 1670. After Karl Bens' creation, several models of internal combustion cars were handcrafted. This type of technology and production process then began to be common in the beginning of the era of locomotion vehicle automation, until there was the implementation of a production line. The production line created by Henry Ford enabled the vehicles to be manufactured on industrial scale by a series of standardized steps, according to the practice adopted by Ford.

Thus, at the time of the Ford, different brands and factories began the mass production of internal combustion cars and, differently from the first German model, the manufacturers were always looking for engines that were capable of bringing more power to the vehicles. For this reason, engines having more than one drive cylinder were developed by the manufacturers and implemented in the vehicles. Still in the beginning of the 20th century, engines having two and four cylinders began to be developed implemented in the automotive vehicles.

The most common engine used in cars since the creation thereof is the four stroke one. The strokes are known as intake, compression, combustion and exhaust. The intake step occurs when the fuel is inserted in the cylinder of the piston and it is followed by the compression step, which is when the piston compresses the fuel against the base of the spark plug. The third step consists in the combustion step which occurs precisely when the spark plug ignites, creating a spark in the compressed fuel, there occurring an explosion, this being responsible for pushing the piston, which, when pushed, turns the crankshaft. Finally, the fourth and last step consists in the exhaust step, which occurs when the gases resulting from the explosion are expelled by the return of the piston. All these four steps result in a complete cycle for each two complete turns of the crankshaft. Due to this configuration, the larger the number of cylinders of an engine, that is, the larger the number of pistons, the more powerful will be the engine.

As it is possible to observe, the working of the combustion engine depends on a flammable fuel, whereby the use of gasoline and diesel is very common which are products derived from petroleum distillation. It is known that the worldwide consumption of energy increased 27% since the years 2000 until nowadays, whereby in this context, the demands involving the consumption of petroleum duplicated when compared with the growth of the renewable energies. As regards the consumption of fossil fuels, in Brazil, statistical data from the National Petroleum, Natural Gas and Biofuels Agency showed that the general consumption of fuels in 2012 was of 129.677 trillion liters. This represents an increase of 6.1% relative to the 122.222 trillion liters of the previous year. In 2015, the sales of fuels in the Brazilian market reached a total of 141.541 billion liters. To complement, the commercialization of type C gasoline in Brazil was of 41.137 billion liters in 2015. For this reason, currently alternatives are being sought to substitute or improve the internal combustion engines, with the purpose of improving the yield of these equipment, as well as when it is verified how much the reduction in consumption of fossil fuel for reduction of environmental impacts.

Thus, the search for fuels originating from renewable sources is urgently necessary, due to the scarcity of natural resources. Alcohol, being of an organic origin, shows itself to be a viable alternative in the search for a less pollutant fuel. In this context, alcohol based internal combustion engines are already widely disclosed in the market and, do not show a great acceptance, due to the fact that they still present low yield (low autonomy) when compared to the fossil fuel supply. The yield of the vehicles fueled with alcohol in "flex" cars is, in average, 32% lower than common gasoline and, therefore, the consumer understands that monetarily he will only be compensated by fueling up with alcohol, in case the organic fuel is at the most 68% of the price of the fossil fuel.

Moreover, this line of development of solutions that are environmentally correct, the cars with electric engines, have been gaining market space, particularly due to having the characteristic of using a clean energy some manufacturers are still studying how to avoid using gasoline as fuel for the internal combustion engine. One of the alternatives was the use of hydrogen in the already known engines, much used in external combustion engines, such as in rockets. To this end, several companies sought devices to use the hydrogen in current engines, which is why, one of the solutions was to improve the consumption of gasoline by injecting more hydrogen in the composition thereof.

With this scenario, new technologies and innovations that are capable of increasing the autonomy of vehicles, as well as reducing the emission of pollutants for the atmosphere become more and more indispensable. In the Euro region, for example, the brands are investing increasingly more in downsizing, turbo, new gear and cutting edge technology such as KERS, a system for the recovery of kinetic energy.

Thus, in Europe new rules regarding the emission of atmosphere pollutants, as well as measures to determine a limit of fossil fuel combustion per automotive vehicle, have come into force with the purpose of optimizing the consumption of these fuels.

For this purpose, patent document no. DE 102012006827, entitled "Method for operating combustion engine of motor car, involves producing required amount of hydrogen by electrolysis process for operation of combustion engine, and transferring hydrogen and oxygen into combustion chamber", describes a device where, by means of hydrolysis, hydrogen is produced from water to mix to the fuel. Said device uses a temperature and electricity control to heat the water and produce hydrogen inside the car. However, this solution does not generate the same technical benefit of the object proposed in the present invention, which proposes developing again as regards the fossil fuel and reduction of carbon monoxide. Additionally, the system of the proposed device does not generate residues since it does not add any element to the equipment, such as for example liquid binders, substantially surpassing the solution described in the German patent document.

Indian patent document no. IN2012DE00086, entitled "DEVELOP ON BOARD CATALYTIC FUEL PRODUCTION KIT FOR CAR", wherein there is described the creation of a kit to be installed in cars for producing hydrogen from water, in thesis, the invention particularly refers to a multi-electrode cell which uses saline water aluminum electrodes as electrolyte. However, it can be observed that this type of solution can be highly explosive, in case the system presents any defects, since the production of hydrogen must be highly controlled to guarantee the safety of the system. That is, it is evident that a failure in the system can generate a rapid reaction of the hydrogen, which is an extremely flammable gas, the oxygen bringing risks to drivers and passengers of the vehicle.

As observed from the state of the art, there are not yet known solutions which foresee a device for potentializing the consumption of fuels in automotive vehicles which presents yield, without generating risks to the explosions and/or pollutant waste in the atmosphere. Additionally, it can be emphasized that no device and/or system is known which proposes and allows generating hydrogen by controlled temperature induction. Thus, it is affirmed that none of the solutions that are available in the market has the same performance as the present invention, that is, none of the solution activates the hydrogen of the composition of the fossil fuel by heating the fuel in scale together with the passage space.

NOVELTIES AND OBJECTIVES OF THE INVENTION

The present invention presents a device and system which corrects the problems of the state of the art, since it presents a solution to help in the performance yield and/or autonomy of the internal combustion engines.

In a general manner, the present invention proposes a device and system to be installed in automotive vehicle engines and, therefore, without the need to carry out any structural alterations to the factory engines. The solution proposed in the present specification comprises a low-cost accessory installed to be adapted to the fuel entry hose in the electronic injection system of automotive vehicles. This being so, from the installation of the device in the vehicle, the fuel is modified before it is fed to the engine, guaranteeing that the yield is higher.

In summary, the proposed device has the purpose of helping internal combustion engines, aiming at an increase in yield of up to 15%, optimizing the burning by the alignment and improvement of the fuel molecules. Moreover, the device enables the use of hydrogen in the fuel, without the need for a storage system for same.

DESCRIPTION OF THE DRAWINGS

In order to ensure that the present invention is fully understood and put into practice by any technician in this technology sector, the same will be described in a clear, concise and sufficient manner, having as a basis the below listed attached drawings, that illustrate and subsidize the same.

BRIEF DESCRIPTION OF THE DRAWINGS

Figure 1:
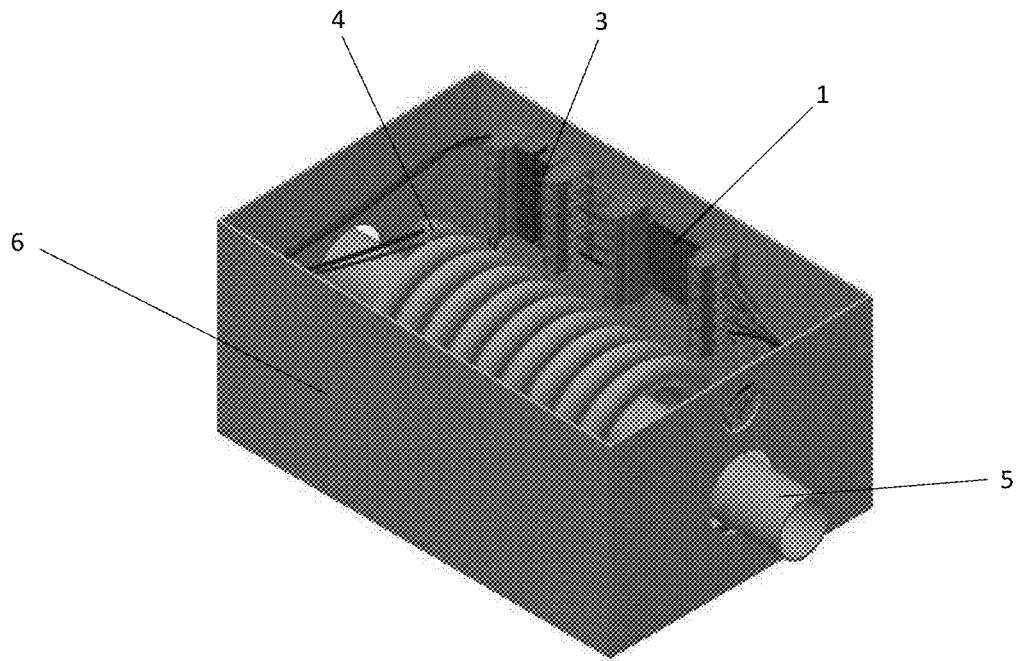
FIG. 1 represents, as an example, a perspective view of the device.
Figure 2:
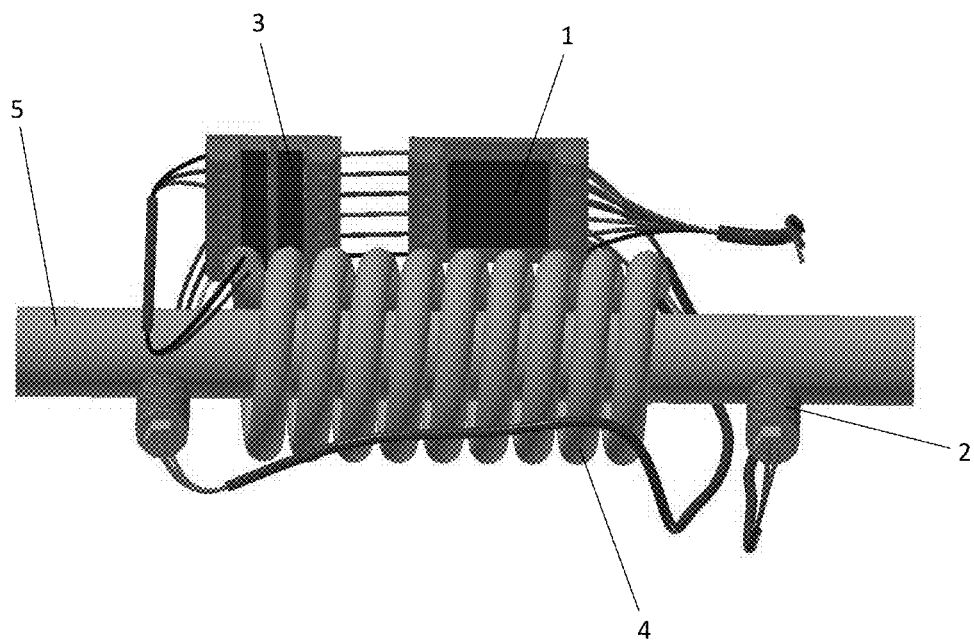
FIG. 2 represents, as an example, a front view of the device without the protective cover.

In a general manner, the device of the present invention is installed in the engines of automotive vehicles, in the fuel line between the engine and the fuel tank that stores the fuel that feeds the car's engine, more specifically, by the fuel entry, in general at the front part of the vehicle, up to the beginning of the injector nozzle flute. The device in question consists basically of a casing (6) which comprises internally arranged at least one resistor (4), which involves at least one tube (5). The resistor (4) is connected to a central circuit (1), which communicates with temperature sensors (2) and with a control circuit (3). The temperature sensors (2) are installed, preferably at the entry and exit of the casing (6).

The solution foresees that there can be used hose couplings similar to the ones currently used in vehicles or any other equivalent or similar fixation and sealing means. In this manner, before the fuel enters the fuel injection system of the vehicle, the same goes through the copper transformation chamber. This step of the course allows the fuel to suffer a chemical molecular reaction which modifies a part of the same, thus increasing the supply combustion energy capacity.

Thus, from the installation of the device in the automotive vehicle, the internal system of the same executes an inductive thermal exchange in the fuel, making the hydrogen, which is present in the fuel itself, release from the water that is present in its composition. Thus, the quantities of hydrogen present in the fuel water, which would then be dispatched via the exhaust pipe, are joined to the fuel by the induction reaction generated in the device. This induction reaction, provides higher capacity of energy combustion and, consequently, a more homogeneous burning. The device thus allows a controlled temperature change, which allows the fuel to reach a higher fuel quality, making the internal combustion engine not consume so much fuel and maintain the high performance. That is, this increase in the fuel energy capacity occurs by an inductive heating caused in the fuel, due to the variation of the low voltage electric charges which vary from 10 to 14V and induced amperage from 8 to $12^a$. Preferably, the device submits the fuel to low voltage 12V electric charges and 10 A amperage in the resistor (4).

The device carries out this molecular reaction by means of the temperature increase between 60° C. and 80° C. More specifically, the increase in temperature can vary from 65 to 69° C. in gasoline, 70 to 73° C. in ethanol, and between 64 to 70° C. in the diesel oil. The fuel temperature is controlled by a central circuit (1), which communicates with temperature sensors (2) installed at the entry and exit of the device, and with a control circuit (3) that is responsible for the control of the temperature increase. The maximum temperature of each fuel is calculated from the Hydrogen burning temperature, which is of 73° C. and from the quantity of oxygen in the fuel. In case the temperature exceeds 73° C., there is the risk of losing fuel quality, which may increase the consumption of the engine. To avoid this loss, the device counts on temperature sensors (2) in direct communication with the central circuit (1) which can turn off and interrupt the current in the resistor (4) in case the temperature gets close to the limit defined in the control circuit (3) of the present invention.

The central circuit (1) is comprised by at least one PIC board, which is fed by the battery of the vehicle, whereby the said PIC board sends pulses to the relays of the control circuit (3), sending the necessary amperage to feed the resistor (4). Moreover, based on the information provided by the temperature sensors (2), the central circuit (1) controls the amperage level which passes to the control circuit (3).

However, it is possible that the control circuit (3) receives the current directly from the vehicle battery, being capable of controlling the level of current which passes to the resistor (4) by means of pulses emitted from the central circuit (1). To this end, the control circuit (3) must be comprised by control relays, enabling the control of the passage of the current to the resistor (4) by means of the pulses received from the central circuit (1). That is, the control relays can control the quantity of amperage sent to the resistor (4). In this way, the amperage received by the resistor (4) is controlled, and may vary from 8 to 12 A.

To be able to control the temperature by means of the current increase, the temperature sensor (2) located at the entry sends the entry temperature of the fuel to the central circuit (1), and the temperature sensor (2) located at the exit of the device sends to the central the temperature at which the fuel is exiting the device. With this information, the central circuit (1), communicates, via pulses, with the relays of the control circuit (3), defining the quantity of current in the resistor (4) which is necessary to maintain the fuel at the ideal temperature.

The resistor (4) heats a tube (5) having from 8 to 12 mm diameter, through which the fuel passes and suffers the molecular reaction. With the purpose of avoiding waste, the resistor (4) also presents a thermal blanket (not shown), surrounding the set and avoiding loss of heat. The resistor (4) has a length that can vary between 5 and 10 cm to fully execute the molecular reaction in the fuel.

The resistor (4) is responsible for the increase in temperature, which can vary between 60° C. and 80° C., of the fuel that passes through the tube (5). With this temperature increase, the fuel suffers the molecular reaction, wherein the hydrogen in the water that is present in the fossil fuels distributed by the refineries is released from the oxygen, forming pure "H" hydrogen. This pure "H" hydrogen, reacts with the gasoline, ethanol or diesel inside the device. In this case, the combustion energy of the device is optimized, since the "H" hydrogen released from the water of the fuel is the element having larger charge to cause the explosion of the input, increasing the yield thereof. This being so, to increase the yield, the number of hydrogens from the fossil fuel used is increased, increasing the octane rating of the fuel generating a better burn.

Portuguese Description

With this induction, for example, the gasoline of structural formula $C_8H_{18}$ comes to comprehend a larger number of hydrogen molecules in the structural composition thereof. That is, with the molecular reaction with the pure "H" hydrogen generated, the fuel goes from $C_8H_{18}$ to $C_8H_{36}$, thus characterizing a more powerful fuel and requiring less consumption by the engine.

Finally, it must be noted that the device is preferably installed at the fuel entry in the front part of the vehicle up to the beginning of the injector nozzles flute. For this purpose, the device counts on a universal coupling to be able to be installed in any automotive vehicle.

It is important to emphasize that the figures and description made are not intended to limit the execution forms of the inventive concept now proposed, but to illustrate and make comprehensible the conceptual innovations disclosed in this solution. In this manner, the descriptions and images must be interpreted in an illustrative and not limitative manner, whereby there may exist other equivalent or analogous forms of implementation of the inventive concept now disclosed and which do not escape from the scope of protection outlined in the proposed solution.

The present specification dealt with a new device installed in automobiles for fuel energy economy as from the multiplication of the hydrogen created from an inductive exchange of temperature carried out in the fuel itself for industrial application, comprising novelty, inventive activity, descriptive sufficiency, industrial application and, consequently comprising all the essential requirements for the granting of the claimed privilege.

What is claimed is:

1. A device for heating and monitoring the temperature of fuel in an internal combustion engine comprising: a casing installed between the engine and a fuel tank of a vehicle which includes an internally arranged at least one resistor and at least one fuel passage tube which is heated by said resistor; the tube being surrounded by said resistor wherein said resistor is connected to at least one central circuit, the device being charged by the vehicle battery; and wherein said central circuit is further connected to one or more temperature sensors installed at the exit and entry of the device, the fuel temperature being controlled by variation of the current of the resistor controlled by said central circuit through a control circuit based on information from the temperature sensors and the fuel only flows inside the fuel passage tube, without direct contact with the resistor, heating indirectly as it passes alongside the tube; said central circuit comprises at least one PIC circuit; said control circuit comprises one or more relays being fed by said central circuit; said control circuit comprises control type relays; and said central circuit communicates and/or controls the control circuit by one or more pulses.

2. The device of claim 1, wherein the control circuit is fed directly by said vehicle battery.

3. The device of claim 1, wherein said resistor receives tension between approximately 10 and 14V and amperage between approximately 8 to 12 A.

4. The device of claim 1, wherein said resistor provides temperature variation control, wherein the temperature is between 60 and 80° C.

5. The device of claim 4, wherein the ideal temperature for gasoline is between 65 and 69° C; the ideal temperature for the ethanol is between 70 to 73° C; and the temperature for diesel is between 64 to 70° C.

\* \* \* \* \*